(12) United States Patent
Ofer

(10) Patent No.: US 7,989,558 B2
(45) Date of Patent: Aug. 2, 2011

(54) CRYSTALLIZED POLYETHYLENE TEREPHTHALATE, WHICH CONTAINS SILICON, AND PROCESS FOR ITS PREPARATION

(76) Inventor: Zeev Ofer, Prague (CZ)

( * ) Notice: Subject to any disclaimer, the term of this patent is extended or adjusted under 35 U.S.C. 154(b) by 619 days.

(21) Appl. No.: 11/631,613

(22) PCT Filed: Jul. 7, 2005

(86) PCT No.: PCT/IB2005/001972
§ 371 (c)(1),
(2), (4) Date: May 19, 2008

(87) PCT Pub. No.: WO2006/006064
PCT Pub. Date: Jan. 19, 2006

(65) Prior Publication Data
US 2008/0262167 A1  Oct. 23, 2008

(30) Foreign Application Priority Data

Jul. 8, 2004 (CH) ....................................... 1143/04

(51) Int. Cl.
*C08J 11/04*  (2006.01)

(52) U.S. Cl. ........................................ 525/446; 528/272
(58) Field of Classification Search .................. 525/446; 528/272

See application file for complete search history.

(56) References Cited

U.S. PATENT DOCUMENTS 5,759,685 A * 6/1998 Baris et al. ..................... 428/364
2003/0135015 A1* 7/2003 Fujimaki et al. .............. 528/272

FOREIGN PATENT DOCUMENTS

WO 03 104314 * 12/2003

* cited by examiner

*Primary Examiner* — Kuo-Liang Peng
(74) *Attorney, Agent, or Firm* — Merchant & Gould

(57) ABSTRACT

The present invention is directed to crystallized polyethylene terephthalate, PET, which contains silicon in a bounded M and integrated into the molecular structure of PET form. The crystallized form preferably has been obtained by a temperature treatment of amorphous PET, which contains silicon in a bounded and integrated into the molecular structure of PET form. There is also described a process for the preparation of crystallized polyethylene terephthalate, PET, which contains silicon in a bounded and integrated into the molecular structure of PET form.

55 Claims, 2 Drawing Sheets

CRYSTALLIZED POLYETHYLENE TEREPHTHALATE, WHICH CONTAINS SILICON, AND PROCESS FOR ITS PREPARATION

BACKGROUND OF THE INVENTION

The invention is directed to crystallized polyethylene terephthalate, PET, which contains silicon, and to a process for its preparation.

It is well known that some polymeric materials, for example PET, may only be used once in their original form.

There is not yet known an ecologically safe and economically effective process with which waste-PET, post consumer PET waste, may be regenerated and/or modified for a further use in the food industry (food contact substance).

All over the world a lot of waste-PET (post consumer PET waste) is collected and is just disposed. Therewith is created an environmental problem.

It is further known that waste-PET may not be burned in an environmentally friendly way, because among others carcinogenic benzopyrenes are formed.

It has been proposed to incorporate waste-PET into new, fresh PET, so-called "virgin"-PET. Thereby in maximum 5 parts by weight of waste-PET may be incorporated into 95 parts by weight of "virgin"-PET, to avoid adversely effecting the quality of the respective product.

In this technology a very high vacuum must be applied in order to remove the volatile, toxic contaminations; see the VACUREMA technology of the company Ere-ma in A-4052 Ansfelden/Linz in Austria.

It has also been proposed to cleave waste-PET into the components terephthalic acid and ethylene glycol. These components may be used again for the synthesis of PET. This process needs technically complicated devices and is correspondingly expensive.

In WO 03/104314 A1 there is described a process for processing polyester wastes, for example waste-PET. In this process neither a vacuum technology nor a cleavage into partial components is used.

In this process crushed, washed and dried waste-polyester flakes are heated to a temperature of 130° C.±5° C. At this temperature is added a defined modifying agent in an amount from 4% by weight to 6% by weight, referred to the total mass.

Then the obtained mixture is stirred for about 60 minutes at this temperature.

Then the mixture is introduced into an extruder, heated to a temperature from 240° C. to 250° C., and extruded. The extrudate is pelletized.

The obtained pellets are amorphous. These amorphous pellets may not be further processed by means of standard injection moulding technology, because they stick together during the preheating.

In WO 95/01471 there is described a process for producing soil-repellant and abrasion-resistant monofilaments for screen cloth having a diameter from 0.1 to 1.0 mm from a linear silicon modified polyethylene terephthalate. In this process there is incorporated from 0.15 to 5.0% by weight of polydialkylsiloxane by co-condensation into the chain of the polymer.

According to the example of WO 95/01471, the silicon containing polymer is prepared by polycondensation of the monomers dimethyl terephthalate and ethylene glycol with an addition of 3.9% by weight of polydimethyl siloxane and manganese acetate. An antimony catalyst is used as an essential component of said polycondensation process.

The process of co-condensation takes place in an autoclave at elevated temperatures and by using different pressures.

In U.S. Pat. No. 5,643,998 there is described a recyclable polymer which comprises a plurality of oligomer units. This polymer is obtained by a polymerization process.

It is an object of the invention to reduce the year-to-year increasing amount of waste-PET by transforming waste-PET into a convertible and demanded product.

It is a further object of the invention to provide a simple and cost advantageous process for the preparation of this new product.

This new product can be used as a substitution in industrial preparation processes where up to now "virgin"-PET is used.

With the present invention these objects can be met.

SUMMARY OF THE INVENTION

The present invention is directed to crystallized polyethylene terephthalate, PET, which contains silicon bounded and integrated into the molecular structure of PET form.

The inventive process for the preparation of crystallized polyethylene terephthalate, PET, which contains silicon bounded and integrated into the molecular structure of PET form, is characterized in that in a first step there is added to melted PET not more than 4% by weight, referred to the total of the mass, of at least one modifying agent, which contains silicon and which is able to connect together low molecular fragments of PET, then the ingredients are mixed and allowed to react, then in a second step the obtained product is extruded in the desired form, the extruded amorphous product, which contains silicon bounded and integrated into the molecular structure of PET, is cooled for maintaining the amorphous form, in a third step the amorphous product is subjected to a temperature treatment for a controlled transformation into the crystallized form, and in a fourth step the formed crystallized product is obtained.

The inventive crystallized polyethylene terephthalate, PET, which contains silicon bounded and integrated into the molecular structure of PET form, may be used as a substitute of polyethylene terephthalate, which contains no silicon. For example, it may be used as raw material for the preparation of a preform, raw material for the preparation of fibers, wires, sheets.

DETAILED DESCRIPTION OF PREFERRED EMBODIMENTS

Figure 1:
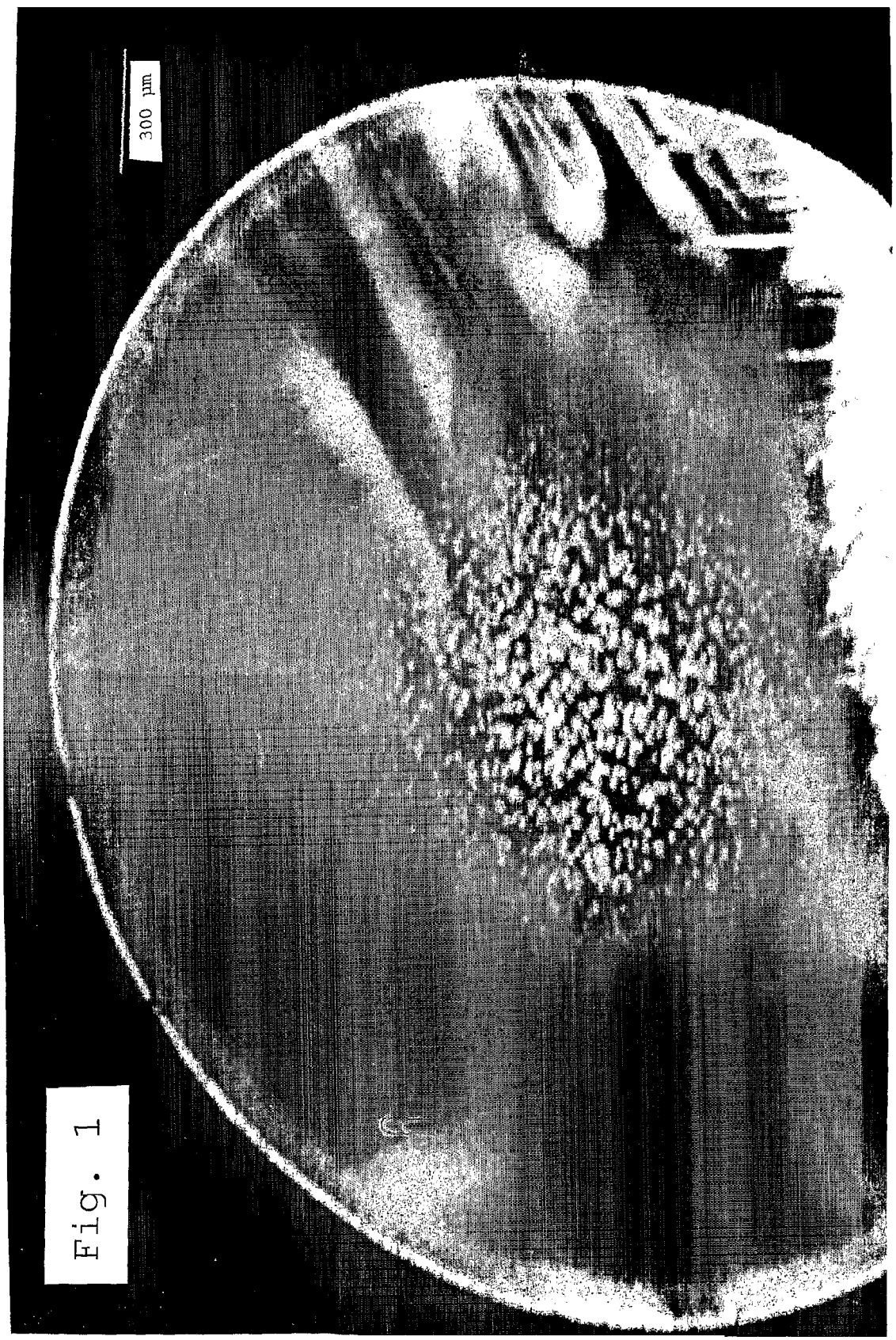
FIG. 1 shows the microscopic analysis of amorphous PET; obtained according to the example 1 as mentioned further below.

As noted above, the invention relates to crystallized polyethylene terephthalate, PET, which contains silicon in a bounded and integrated into the molecular structure of PET form. Preferably, the crystallized polyethylene has been obtained by a temperature treatment of amorphous PET, which contains silicon in a bounded and integrated into the molecular structure of PET form.

Also, it is preferable that the crystallized polyethylene terephthalate according to the invention has an average molecular weight of not less than about 40,000. Furthermore, it is preferred that the crystallized polyethylene terephthalate according to the invention has a silicon content from 120 μg to 700 μg per gram of the total of the mass.

As noted above, the invention also relates to a process for the preparation of a crystallized polyethylene terephthalate according to the invention, PET, which contains silicon in a bounded and integrated into the molecular structure of PET form. The process comprises adding to melted PET not more than 4% by weight, referred to the total of the mass, of at least one modifying agent, which contains silicon and which is able to connect together low molecular fragments of PET, then mixing and allowing them to react; and extruding the obtained reacted mixture to its desired form, and cooling the extruded product, which is amorphous and contains silicon in a bounded and integrated into the molecular structure of PET form, for maintaining the amorphous form. Then, the amorphous product is subjected, for a controlled transformation into the crystallized form, to a temperature treatment; and then the crystallized product is obtained.

According to this process, the modifying agent, which contains silicon, is selected such that it can connect together low molecular fragments of PET. Preferably the modifying agent(s) is/are used in amounts that do not exceed 3% by weight. More preferably, the amount is not more than 2% by weight. Most preferably, the amount modifying agent will not exceed 1% by weight. Amounts of modifying agents can be 0.5% by weight.

The modifying agent can be added in the form of a powder or of a liquid. Preferably modifying agents are selected from the group consisting of silanes of the general formula

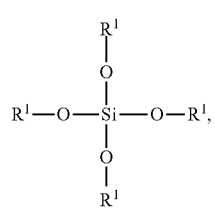

disilazanes of the general formula II,

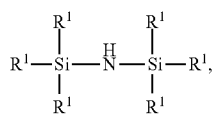

silazanes of the general formula III,

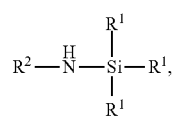

wherein formulae I, II and III, the residues $R^1$ and $R^2$ are, independent from each other, a $C_1$ to $C_6$ containing straight or branched alkyl group, silicone oils,
 diphenylsilandiol,
 polymethylhydrosiloxane, and
 polyethylhydrosiloxane.

With regard to the silicone oils, preferred are oils based on polyphenyl-methylsiloxane, polydimethylsiloxane, or a 1:1 mixture of polydimethylsiloxane and polydiphenylsiloxane.

In the process of the invention polyethylene terephthalate can be "virgin"-PET or waste-PET, post consumer PET waste, such as that obtained from crushed, washed and dried PET bottles, including any mixtures of "virgin"-PET and post consumer PET waste. The melt preferably has a temperature from about 260° C. to about 300° C., most preferably about 260° C.

In a preferred embodiment, the modifying agent(s) is/are added continuously into the melting zone of a twin screw extruder.

It is preferred that the reaction time for the melted PET and the modifying agent be from about 3 to about 10 minutes.

Preferably, with regard to cooling of the extruded product, that cooling is realized in water, preferably by underwater pelletizing or by cooling of a continuous string in a water bath, followed by a pelletizing.

According to the invention, the extruded string can have any cross section. These can include round, angular (e.g., a 3- to 8-angular), and elliptic cross sections.

It is preferred in the temperature treatment for the transformation of the amorphous product into a crystallized product that the temperature from about 135° C. to about 165° C. during at least about 30 minutes. Most preferably the heat treatment is conducted for about 1 to about 2 hours.

The process described above can be stopped if it is desired to recover an amorphous polyethylene terephthalate which contains silicon in a bounded and integrated into the molecular structure of PET form.

The crystallized polyethylene terephthalate (PET) according to the invention can be used as raw material for the preparation of a preform, fibers, wires, and sheets. In this regard, it is particularly useful as a substitute for polyethylene terephthalate, which contains no silicon.

In use the crystallized polyethylene terephthalate according to the invention can be mixed in any suitable mixing ratio with other polymeric materials such as polypropylene (PP), polycarbonate (PC), or polyethylene terephthalate, which contains no silicon. In this regard, the crystallized polyethylene terephthalate according to the present invention can be mixed in any mixing ratio with other materials which are suitable for the preparation of a preform such as polyethylene terephthalate, which contains no silicon.

From the inventive crystallized polyethylene terephthalate, PET, which contains silicon bonded and integrated into the molecular structure of PET form, any preform may be prepared by means of known injection moulding technology. If, before the injection a suitable colorant is added to the melt, then a correspondingly coloured preform can be obtained.

From such a preform, any commodity, may be prepared by means of known blowing technology: for example, closable containers of any shape. Such containers may be used for the uptake of food such as mineral water, soft drinks, vinegar, and oil, or of cosmetic articles such as creams, shampoos, gels.

It is preferred to use blowing technology to prepare from a preform bottles for the uptake of mineral water or soft drinks, with or without carbon dioxide ($CO_2$).

These commodities may be recycled after their use.

Without further treatment, the amorphous pellets obtained at the end of the second step of the inventive process may not be further processed by means of standard injection moulding technology, because they stick together during preheating.

The following examples illustrate the present invention.

Example 1

300 kg of crushed, washed and dried flakes from waste-PET bottles were given into the hopper of a twin screw extruder.

The flakes had a size from 2 mm to 10 mm.

The velocity of the extruder was adjusted such that 5 kg of PET flakes could be processed in one minute.

In the 12 zones of the extruder the temperature was from 230° C. to 280° C. The temperature within the melting zone was 260° C.

A dosing device was installed at the melting zone of the extruder.

The dosing device comprised a rotation pump by which the velocity of the addition of the modifying agent was adjusted. With the dosing device, per minute 50 ml of hexamethyldisilazane were dropped onto the PET-melt.

300 kg of flakes were processed using 3 l of hexamethyldisilazane.

In the zones of the extruder following dosing the reaction took place between the melted PET and the modifying agent.

The gaseous side products were drawn off in the degassing zone by means of a pump.

Installed at the outlet opening of the extruder was an underwater pelletizing system (Master 1000) of BKG Bruckmann & Kreyenborg Granuliertechnik GmbH in D-48157 Munster/Germany.

Amorphous, transparent and clear pellets were obtained having diameters of from about 1 mm to about 3 mm.

These amorphous pellets cannot be further processed by means of standard injection moulding technology, because they will stick together during the preheating.

On a vibration transporting table of BKG Bruckmann & Kreyenborg Granuliertechnik GmbH, the amorphous pellets were converted into crystallized pellets.

The crystallized pellets were mat and white.

The amorphous pellets were subjected to a microscopic analysis, the result of which is shown in FIG. 1.

Figure 2:
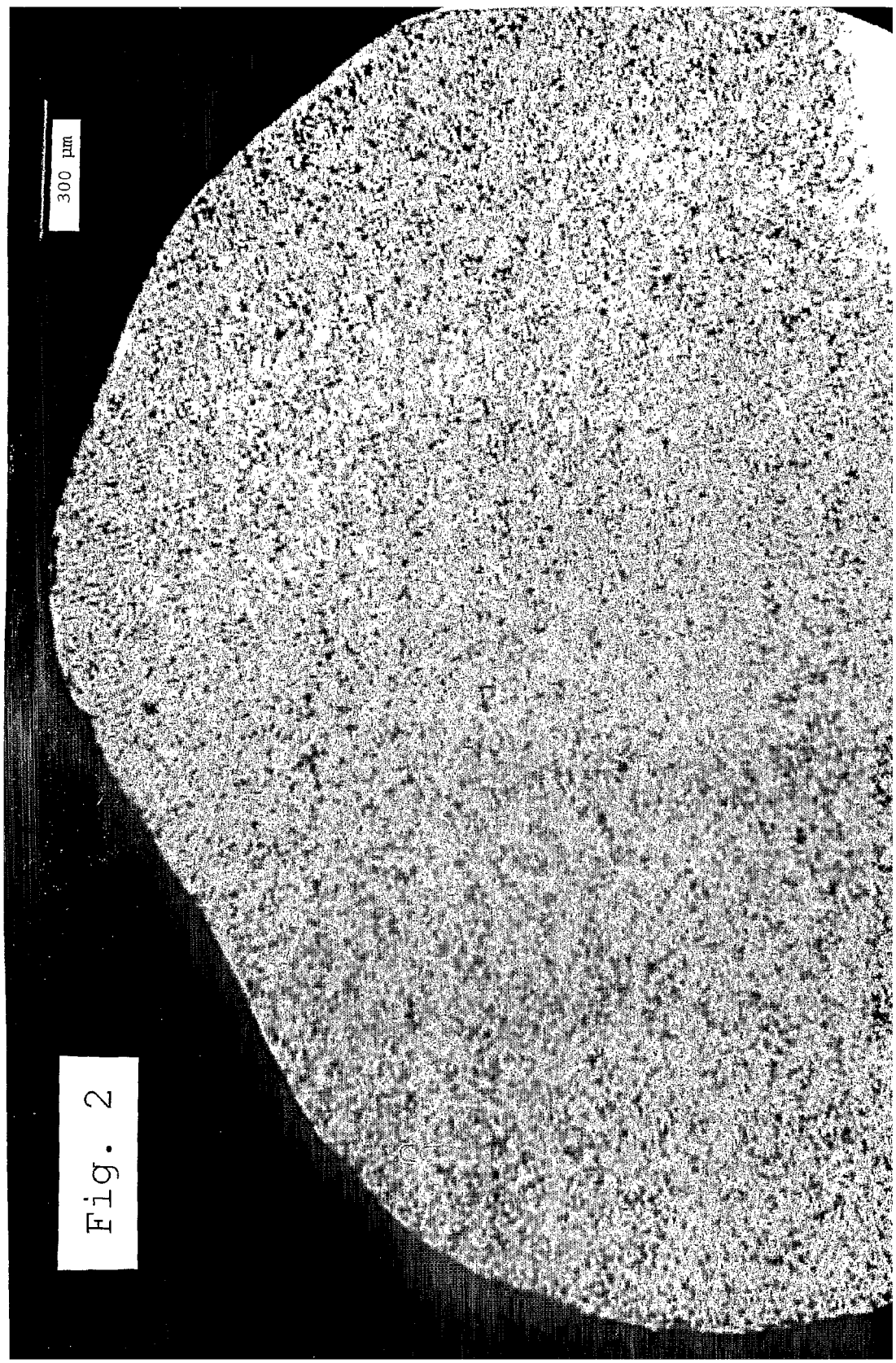
FIG. 2 shows the microscopic analysis of crystallized PET; obtained according to the example 1 as mentioned further below.

The crystallized pellets were subjected to a microscopic analysis, the result of which is shown in FIG. 2.

As shown in FIG. 1, the molecules of PET are free and the material is transparent and clear.

As shown in FIG. 2, the structure of the molecules of PET is fixed and [that] the material is mat and white.

Both the amorphous and the crystallized pellets had a silicon content of 222 µg/g of pellets.

The crystallized pellets may be used to prepare, by means of known injection moulding technology, any preform.

Example 2

In analogy to example 1 were used 3 l of tetraethoxysilane instead of hexamethyldisilazane.

Analogous results were obtained.

Example 3

In analogy to example 1, 3 l of poly-ethylhydrosiloxane were used instead of hexamethyldisilazane.

Analogous results were obtained, except the colour of the amorphous and of the crystallized pellets was grey.

Example 4

In analogy to example 1, 1.5 kg of diphenylsilandiol were used instead of hexamethyldisilazane. It was added in finely powdered form by means of a feeding screw. There were added 25 g per minute.

Analogous results to those described in Examples 1 and 2 were obtained.

The invention claimed is:

1. Crystallized polyethylene terephthalate (PET), said polyethylene terephthalate containing silicon bonded and integrated into its molecular structure.

2. A crystallized polyethylene terephthalate (PET) according to claim 1, wherein said polyethylene terephthalate is injection moldable.

3. A crystallized polyethylene terephthalate (PET) according to claim 1, wherein said polyethylene terephthalate is injection moldable and in the form of a pellet.

4. A crystallized polyethylene terephthalate (PET) according to claim 1, wherein said crystallized polyethylene terephthalate has been obtained by a temperature treatment of amorphous polyethylene terephthalate containing silicon bonded and integrated into its molecular structure.

5. A crystallized polyethylene terephthalate (PET) according to claim 1, wherein said polyethylene terephthalate has an average molecular weight of not less than about 40,000.

6. A crystallized polyethylene terephthalate (PET) according to claim 1, wherein said polyethylene terephthalate has a silicon content from 120 ng to 700 ng per gram of the total of the mass.

7. A crystallized polyethylene terephthalate (PET) according to claim 1, wherein crystallized polyethylene terephthalate is mixed with another polymeric material.

8. A crystallized polyethylene terephthalate (PET) according to claim 7, wherein the crystallized polyethylene terephthalate is mixed with polypropylene (PP), polycarbonate (PC), or polyethylene terephthalate, which contains no silicon.

9. Injection moldable pellets of at least essentially fully crystallized, food grade polyethylene terephthalate (PET), said polyethylene terephthalate containing silicon bonded and integrated into its molecular structure.

10. A process for preparing crystallized polyethylene terephthalate (PET) containing silicon bonded and integrated into its molecular structure, said process comprising:

i) adding not more than 4% by weight, relative to the total of the mass, of at least one modifying agent to melted polyethylene terephthalate, said at least one modifying agent containing silicon and being suitable to connect together low molecular fragments of polyethylene terephthalate PET;

ii) mixing the resulting combination of polyethylene terephthalate and modifying agent and allowing them to react;

(iii) extruding the reacted product, the extruded product being amorphous and containing silicon bonded and integrated into its molecular structure;

(iv) cooling the product while maintaining its amorphous form; and (v) subjecting the extruded amorphous product to a temperature treatment for a controlled transformation into the crystallized form.

11. A process for preparing a crystallized polyethylene terephthalate (PET) according to claim 10, wherein the crystallized polyethylene terephthalate (PET) is food grade and injection moldable.

12. A process for preparing a crystallized polyethylene terephthalate (PET) according to claim 10, further comprising:

(vi) pelletizing the crystallized polyethylene terephthalate (PET).

13. A process according to claim 10, wherein said modifying agent is added in an amount of not more than 3% by weight.

14. A process according to claim 13, wherein said modifying agent is added in an amount of not more than 2% by weight.

15. A process according to claim 14, wherein said modifying agent is added in an amount of not more than 1% by weight.

16. A process according to claim 10, wherein said modifying agent is added in the form of a powder or a liquid.

17. A process according to claim 16, wherein said modifying agent is selected from the group consisting of:
silanes of the general formula I,

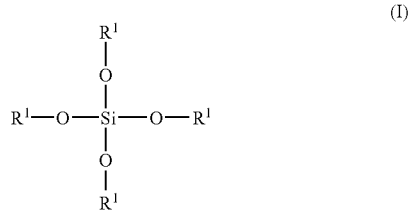

disilazanes of the general formula II,

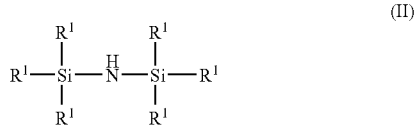

silazanes of the general formula III,

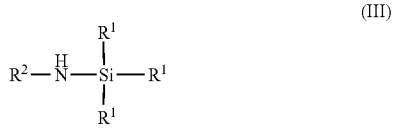

wherein in formulae I, II and III, the residues $R^1$ and $R^2$ are, independent from each other, a $C_1$ to $C_6$ containing straight or branched alkyl group,
silicone oils,
diphenylsilandiol,
polymethylhydrosiloxane, and
polyethylhydrosiloxane.

18. A process according to claim 17, wherein said silicone oils are oils based on polyphenyl-methylsiloxane, polydimethylsiloxane, or a 1:1 mixture of polydimethylsiloxane and polydiphenylsiloxane.

19. A process according to claim 10, wherein in step i) the melted PET is virgin-PET or waste-PET, post consumer PET waste, or a mixture of virgin-PET and post consumer PET waste, and has a temperature from about 260° C. to about 300° C.

20. A process according to claim 19, wherein the post consumer PET waste is obtained from crushed, washed and dried PET bottles.

21. A process according to claim 19, wherein in step i) the melted PET is virgin-PET or waste-PET, post consumer PET waste, or a mixture of virgin-PET and post consumer PET waste, and has a temperature of about 260° C.

22. A process according to claim 10, wherein in step i) the modifying agent is added continuously into the melting zone of a twin screw extruder.

23. A process according to claim 10, wherein the reaction time between the melted PET and the modifying agent is from about 3 to about 10 minutes.

24. A process according to claim 10, wherein the cooling of the extruded product is realized in water followed by a pelletizing.

25. A process according to claim 24, wherein the cooling of the extruded product is realized in water, either by an underwater pelletizing, or by cooling of a continuous string in a water bath followed by a pelletizing.

26. A process according to claim 10, wherein the extruded string has a round, an angular, or an elliptic cross section.

27. A process according to claim 26, wherein the extruded string has a 3- to 8-angular cross section.

28. A process according to claim 10, wherein the temperature treatment for the transformation of the amorphous product into a crystallized product is realized at a temperature of about 135° C. to about 165° C. for at least about 30 minutes.

29. A process according to claim 28, wherein the temperature treatment for the transformation of the amorphous product into a crystallized product is realized at a temperature of about 135° C. to about 165° C. for about 1 hour to about 2 hours.

30. A process according to claim 10, wherein the crystallized polyethylene terephthalate has an average molecular weight of not less than about 40,000.

31. Crystallized polyethylene terephthalate (PET) containing silicon bonded and integrated into its molecular structure, prepared by the process of claim 10.

32. Crystallized polyethylene terephthalate (PET) according to claim 31, wherein the crystallized polyethylene terephthalate (PET) is food grade and injection moldable.

33. Crystallized polyethylene terephthalate (PET) according to claim 31, wherein the process further comprises:
(vi) pelletizing the crystallized polyethylene terephthalate (PET).

34. Crystallized polyethylene terephthalate (PET) according to claim 31, wherein in the process said modifying agent is added in an amount of not more than 3% by weight.

35. Crystallized polyethylene terephthalate (PET) according to claim 34, wherein in the process said modifying agent is added in an amount of not more than 2% by weight.

36. Crystallized polyethylene terephthalate (PET) according to claim 35, wherein in the process said modifying agent is added in an amount of not more than 1% by weight.

37. Crystallized polyethylene terephthalate (PET) according to claim 31, wherein in the process said modifying agent is added in the form of a powder or a liquid.

38. Crystallized polyethylene terephthalate (PET) according to claim 37, wherein said modifying agent is selected from the group consisting of:
silanes of the general formula I,

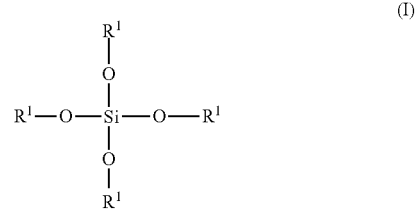

disilazanes of the general formula II,

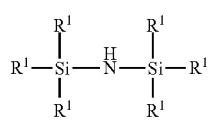

silazanes of the general formula III,

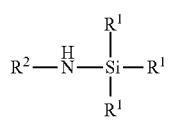

wherein in formulae I, II and III, the residues $R^1$ and $R^2$ are, independent from each other, a $C_1$ to $C_6$ containing straight or branched alkyl group,
silicone oils,
diphenylsilandiol,
polymethylhydrosiloxane, and
polyethylhydrosiloxane.

39. Crystallized polyethylene terephthalate (PET) according to claim 38, wherein said silicone oils are oils based on polyphenyl-methylsiloxane, polydimethylsiloxane, or a 1:1 mixture of polydimethylsiloxane and polydiphenylsiloxane.

40. Crystallized polyethylene terephthalate (PET) according to claim 31, wherein in step i) of the process the melted PET is virgin-PET or waste-PET, post consumer PET waste, or a mixture of virgin-PET and post consumer PET waste, and has a temperature from about 260° C. to about 300° C.

41. Crystallized polyethylene terephthalate (PET) according to claim 40, wherein the post consumer PET waste is obtained from crushed, washed and dried PET bottles.

42. Crystallized polyethylene terephthalate (PET) according to claim 40, wherein in step i) of the process the melted PET is virgin-PET or waste-PET, post consumer PET waste, or a mixture of virgin-PET and post consumer PET waste, and has a temperature of about 260° C.

43. Crystallized polyethylene terephthalate (PET) according to claim 31, wherein in step i) of the process the modifying agent is added continuously into the melting zone of a twin screw extruder.

44. Crystallized polyethylene terephthalate (PET) according to claim 31, wherein in the process the reaction time between the melted PET and the modifying agent is from about 3 to about 10 minutes.

45. Crystallized polyethylene terephthalate (PET) according to claim 31, wherein in the process the cooling of the extruded product is realized in water followed by a pelletizing.

46. Crystallized polyethylene terephthalate (PET) according to claim 45, wherein in the process the cooling of the extruded product is realized in water, either by an underwater pelletizing, or by cooling of a continuous string in a water bath followed by a pelletizing.

47. Crystallized polyethylene terephthalate (PET) according to claim 31, wherein the extruded string has a round, an angular, or an elliptic cross section.

48. Crystallized polyethylene terephthalate (PET) according to claim 47, wherein the extruded string has a 3- to 8-angular cross section.

49. Crystallized polyethylene terephthalate (PET) according to claim 31, wherein in the process the temperature treatment for the transformation of the amorphous product into a crystallized product is realized at a temperature of about 135° C. to about 165° C. for at least about 30 minutes.

50. Crystallized polyethylene terephthalate (PET) according to claim 49, wherein the temperature treatment for the transformation of the amorphous product into a crystallized product is realized at a temperature of about 135° C. to about 165° C. for about 1 hour to about 2 hours.

51. Crystallized polyethylene terephthalate (PET) according to claim 31, wherein the crystallized polyethylene terephthalate has an average molecular weight of not less than about 40,000.

52. A process comprising preparing a preform, fiber, wire or sheet from crystallized polyethylene terephthalate (PET), said polyethylene terephthalate containing silicon bonded and integrated into its molecular structure.

53. A process according to claim 52, wherein said crystallized polyethylene terephthalate (PET) is mixed in a suitable mixing ratio with at least one of polypropylene (PP), polycarbonate (PC), or polyethylene terephthalate, which contains no silicon.

54. A process according to claim 52, comprising preparing a preform from pellets comprising injection moldable, food grade crystallized polyethylene terephthalate (PET), said polyethylene terephthalate containing silicon bonded and integrated into its molecular structure.

55. A process according to claim 54, wherein said pellets are prepared from said crystallized polyethylene terephthalate (PET) mixed in a suitable mixing ratio with polyethylene terephthalate, which contains no silicon.

* * * * *

UNITED STATES PATENT AND TRADEMARK OFFICE
CERTIFICATE OF CORRECTION

| | | |
|---|---|---|
| PATENT NO. | : 7,989,558 B2 | Page 1 of 1 |
| APPLICATION NO. | : 11/631613 | |
| DATED | : August 2, 2011 | |
| INVENTOR(S) | : Zeev Ofer | |

It is certified that error appears in the above-identified patent and that said Letters Patent is hereby corrected as shown below:

Column 6, line 22:

"120 ng to 700 ng" should read --120 μg to 700 μg--

Column 7, line 8:

"not more than 16%" should read --not more than 1%--

Signed and Sealed this
Fourth Day of October, 2011

David J. Kappos
*Director of the United States Patent and Trademark Office*